Dec. 16, 1969  G. A. McCOUBREY  3,484,174
ROTARY WING SYSTEM

Filed April 8, 1968  3 Sheets-Sheet 1

INVENTOR.
GEORGE A. McCOUBREY
BY
McCormick, Paulding & Huber
ATTORNEYS

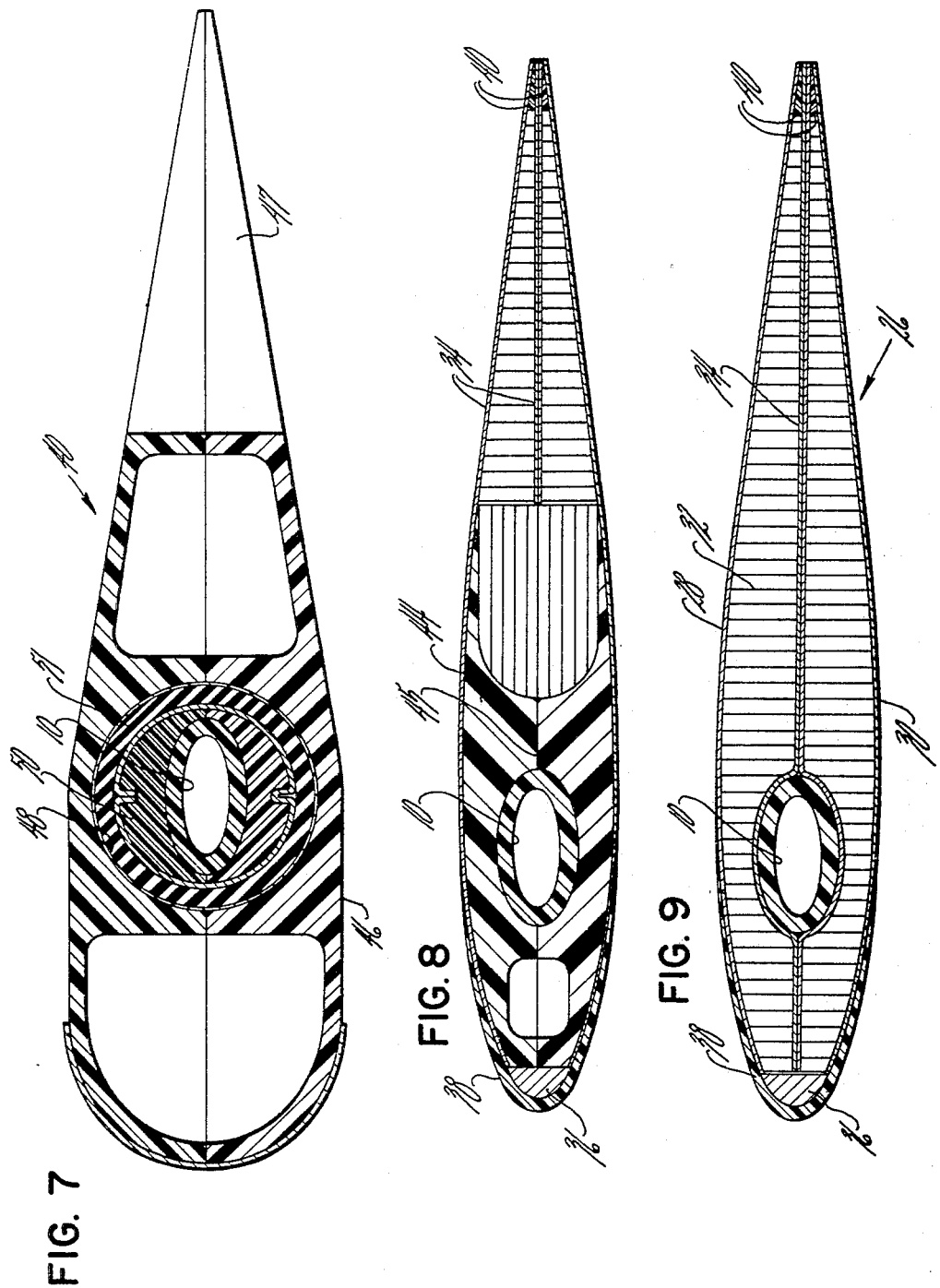

United States Patent Office 3,484,174
Patented Dec. 16, 1969

3,484,174
ROTARY WING SYSTEM
George A. McCoubrey, Newtown Square, Pa., assignor to Kaman Corporation, Bloomfield, Conn., a corporation of Connecticut
Filed Apr. 8, 1968, Ser. No. 719,436
Int. Cl. B64c 27/44, 27/46
U.S. Cl. 416—132                        10 Claims

ABSTRACT OF THE DISCLOSURE

A helicopter rotor system having two blades carried on a common fiberglass spar. The spar is mounted on a mast for rotation therewith, and for movement with respect to a spar flapping axis. Each blade comprises a blade panel bonded to an outboard portion of the spar and a blade cuff bonded at its outer end to the inboard end of each blade panel, and having a pitch horn at its inner end to permit a conventional blade pitch changing mechanism to impart a twisting moment to the inboard portion of the spar.

Summary of invention

This invention relates to rotary wing systems, and deals more particularly with a one-piece spar for two opposed blades of such a system.

A general object of the present invention is to provide a rotary wing system wherein the need for individual blade feathering, or pitch changing bearings is eliminated, the one-piece spar being so constructed that inner portions thereof adjacent the rotor mast are torsionally resilient, said spar being nevertheless rigid enough to carry conventional blade bending loads.

Another general object of the present invention is to provide a rotary wing system of the foregoing character wherein the spar is made of glass fibers bonded in a resinous material, and wherein blade panels are bonded to outboard portions of the spar.

Still another object of the present invention is to provide a rotary wing system of the foregoing character wherein a pitch changing mechanism is connected to the inboard ends of said blade panels through blade cuffs which are bonded to the blade panels and extend radially inwardly toward the mast independently of inner radial portions of said spar.

Brief description of the drawings

FIG. 7 is a sectional view taken along the line 7—7 of FIG. 2.

FIG. 8 is a sectional view taken along the line 8—8 of FIG. 2, and

FIG. 9 is a sectional view taken along the line 9—9 of FIG. 2.

Detailed description

Figure 1:
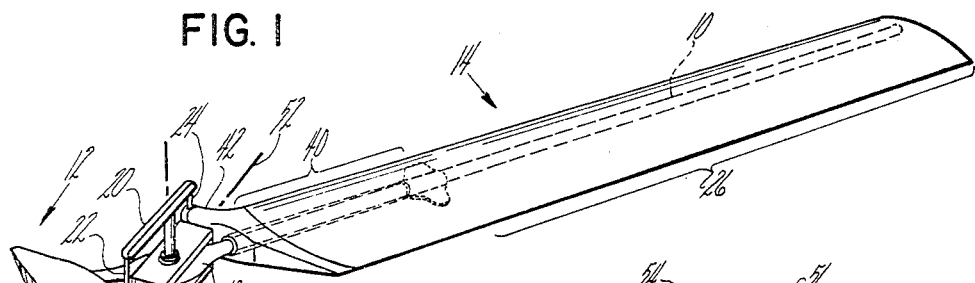
FIG. 1 is a perspective view of a portion of a rotary wing system having a one-piece spar extending across the rotor mast and through both blade panels in accordance with the present invention.

Turning now to the drawings in greater detail, and referring more particularly to FIG. 1, a preferred embodiment of rotary wing system is shown therein as comprising two diametrically opposed blades 12 and 14 (only one of which is shown in full) mounted on a one-piece spar 10. The spar 10 is of continuous one-piece fiberglass construction extending from the tip of one blade 12 to the tip of the other blade 14, and means is provided for mounting the spar at its midpoint to a hollow mast 16. The term fiberglass as used herein refers collectively to both the glass fibers and the resinous material used to suspend the fibers. A conventional blade pitch changing mechanism, including a push rod 18, extends through the hollow mast 16, and a crank arm 20 at the upper end of the push rod 18 is connected to links 22 and 24 associated with pitch horns defined on the blades 12 and 14 respectively.

The blade 12 is a mirror image of the blade 14, and therefore only the blade 14 will be described in detail herein. As indicated generally in FIG. 1, the blade 14 comprises an airfoil shaped outboard blade panel 26 which is continuously bonded to an outboard portion of the fiberglass spar 10. FIG. 9 shows in a chordwise sectional view the airfoil panel portion of the blade 14. The spar 10 is there shown as of annular elliptical cross section with the major axis of the ellipse aligned with the chord of the blade. The blade further includes upper and lower half sections, 28 and 30 respectively, each of which is of conventional honeycomb construction having a honeycomb filler material 32, and having a fiberglass monocoque skin 34 as shown. The leading edge of the panel 26 includes a weight balance 36 and a C-shaped fiberglass cap portion 38. The trailing edge of the blade includes two fiberglass stiffening members 75, 75 extending spanwise along the trailing edge of the half sections 28 and 30 respectively.

Figure 2:
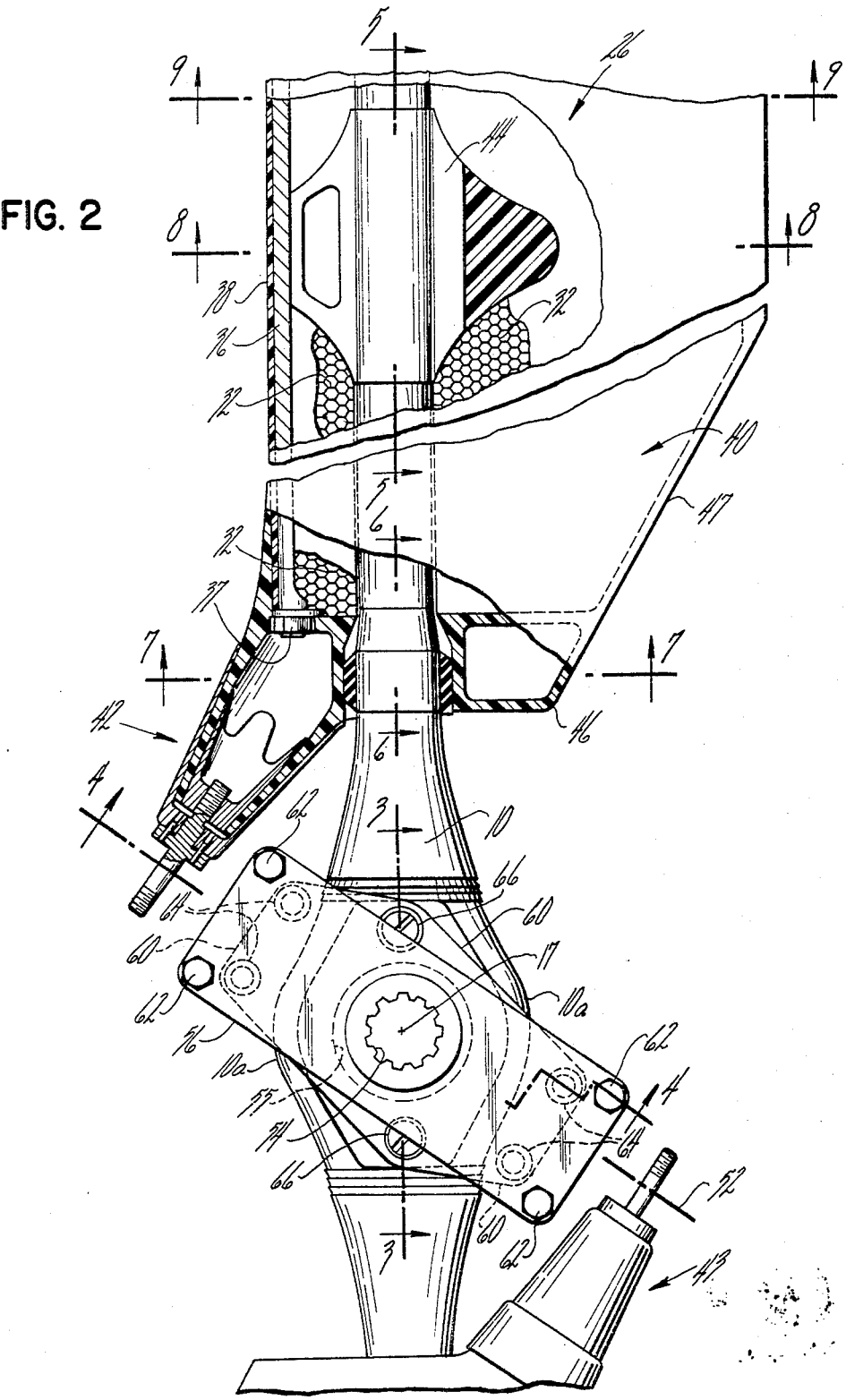
FIG. 2 is an enlarged view of the spar shown in FIG. 1 with portions of an associated blade panel and cuff broken away to better reveal the relationship therebetween.

The blade 14 further includes a blade cuff portion 40 having its outboard end formed integrally with the inboard end of the airfoil shaped blade panel 26 as best shown in FIG. 2. The blade cuff portion 40 extends inwardly toward the axis of rotation 17 of the mast 16 and defines a pitch horn 42 for receiving the lower end of the link 24 associated with the pitch changing mechanism discussed hereinabove. The honeycomb filler material 32, and the fiberglass skin material 34 associated with the airfoil shaped blade portions extend along a substantial spanwise portion of the blade cuff 40 so that the cuff is effectively bonded to the blade panel 26 along the junction defined by sectional line 8—8 of FIG. 2. In order to further strengthen the joint provided between the blade cuff portion 40 and the airfoil shaped panel portion 26, a fiberglass member 44 is bonded to the spar 10 and receives the spar in an opening provided for this purpose. The member 44 includes forwardly and rearwardly extending portions which protrude into the honeycomb structure 32 of the blade. As shown in FIG. 8, the member 44 may be made in halves which are bonded together along the chord line 45. As shown in FIG. 8 the weight balance 36 extends the length of the blade and its inboard end carries a nut 37 for further anchoring the blade cuff 40 to the blade panel portion 26.

Figure 5:
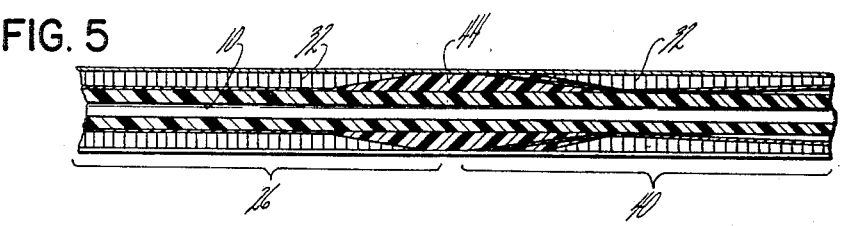
FIG. 5 is a sectional view taken along the line 5—5 of FIG. 2.

Still with reference to FIG. 2, the blade cuff 40 defines a generally elliptically shaped opening for receiving an inboard portion of the spar 10, and it is an important feature of the present invention that the spar 10 is not bonded to the blade cuff portion 40 except in the manner described hereinabove, namely through the member 44. As shown in FIG. 5, the member 44 separates that portion of the blade which is continuously bonded to the elliptical spar 10, indicated by the blade panel portion 26, and that portion of the blade which is not connected to the spar 10, indicated generally by the blade cuff portion 40. The inboard end of the blade cuff 40 is defined by a tapered end fitting 46, the leading edge portion of which defines the pitch horn 42 and the trailing edge portion of which is tapered as indicated in FIG. 2 and FIG. 7 at 47.

Figure 6:
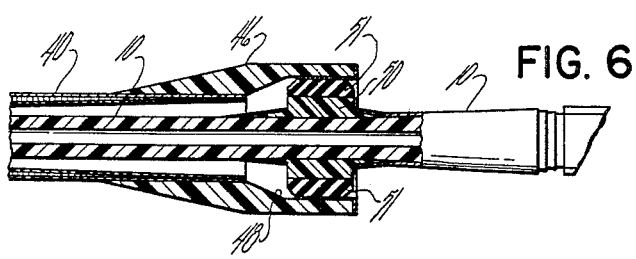
FIG. 6 is a sectional view taken along the line 6—6 of FIG. 2.

As best shown in FIGS. 6 and 7, the end fitting 46 of the blade cuff portion 40 defines a circular opening 48 in which is provided a fiberglass spacer 50 with an elastomeric bearing 51 between the spacer and the blade cuff opening 48 for providing a degree of spanwise bending stiffness for the spar 10 without interfering with the torsional resiliency of the spar 10 in response to pitching moments imposed through the pitch horn 42. As so constructed and arranged, pitching moments imposed by the pitch horn 42 on the blade cuff 40 will tend to elastically twist inboard portions of the spar extending through the cuff so as to vary the lifting force produced by the blade 14.

In the rotor system shown the single one-piece spar 10 is mounted on the rotor mast 16 for rotation therewith, and also for flapping movement about an axis 52, which axis lies below and is parallel to the crank arm 20 of the blade pitch changing mechanism. As so constructed flapping movement of the one-piece spar does not interfere with the blade pitch setting selected by the blade pitch changing mechanism.

Figure 3:
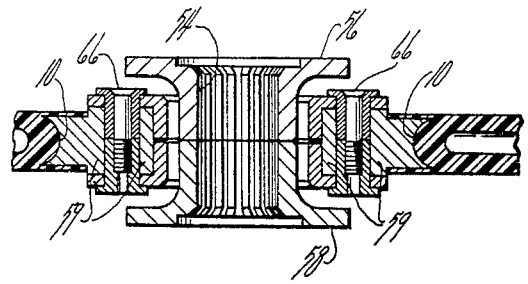
FIG. 3 is a sectional view taken along the line 3—3 of FIG. 2.
Figure 4:
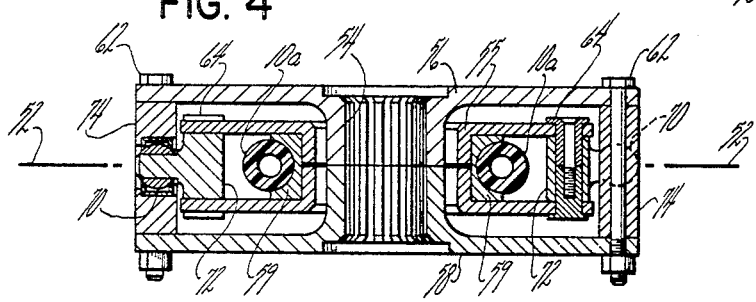
FIG. 4 is a sectional view taken along the line 4—4 of FIG. 2.

The means for so mounting the spar 10 comprises a two-part spar yoke assembly, best shown in FIGS. 3 and 4, having a splined central opening 54 for nonrotatably receiving the upper end of the hollow mast 16.

The elliptically shaped spar 10 has a center portion, best shown in FIG. 2, of expanded planform with an opening 55 defined therein to loosely receive depending bosses on upper and lower half sections, 56 and 58 respectively, of the yoke assembly. The sections 56 and 58 are attached to one another by screws 62, 62. The center portion of the spar 10 comprises two arcuate fiberglass spar portions 10a, 10a best shown in FIGS. 2 and 4, which spar portions are spread apart to encircle the depending bosses on the half sections 56 and 58 of the split yoke assembly. The spar portions 10a, 10a are actually continuations of the elliptically shaped continuous spar 10, the glass strands of fiberglass cloth being split apart in this area during forming of the spar to provide an eye shaped opening defined on either side by the annular-circular spar portions 10a, 10a. An aluminum insert 59 holds these spar portions in spread apart relationship and also serves to add structural rigidity to the spar center portion. The center portion of the spar 10 is further strengthened by a split collar 60 having upper and lower portions which are attached to one another so as to clamp the spar center portion therebetween. Screws 64, 64 serve to so attach the collar portions to one another as best shown in FIG. 4. The screws 66, 66, best shown in FIG. 3, also serve to hold the collar portions to one another, and in addition, pass through openings in the aluminum insert 59 to securely fix or clamp the spar center portion between said collar portions. As shown in FIG. 2, the collar 60 is of somewhat irregular shape having end portions with openings for receiving the screws 64, 64, and having intermediate land portions with openings for receiving the screws 66, 66.

The collar 60 and hence the spar 10 are pivotally mounted in the yoke assembly on ball joints 70, 70 mounted in end blocks 72, 72, which blocks are held to the collar 60 by the screws 64, 64. The mating parts of the ball joints are defined by end plates 74, 74 carried at opposite ends of the yoke assembly half sections 56 and 58 by the screws 62, 62 as best shown in FIG. 4. As so constructed and arranged the yoke assembly defines the spar flapping axis 52, which axis rotates with the rotor and is in line with the pitch horn attachment fittings so that the spar can pivot as it rotates without interfering with operation of the blade pitch changing mechanism.

I claim:

1. A rotary wing system comprising a mast rotatable on its longitudinal axis, at least two rotor blades arranged on opposite sides of said axis, a one-piece spar extending across said axis from the tip of one blade to the tip of the other blade, means for mounting said spar at its midpoint to said mast for rotation therewith, said blades including airfoil panels continuously bonded to outboard portions of said spar, and blade cuffs bonded at their outboard ends to the inboard ends of said airfoil panels and extending inwardly toward said axis of rotation, and a conventional blade pitch changing mechanism connected to inboard ends of said blade cuffs and operable to elastically twist the inboard portions of said spar to vary the force produced by said rotary wing system.

2. The combination defined in claim 1 wherein said spar is formed from fiberglass strands embedded in a resinous material, said strands extending from blade tip to blade tip, and wherein said inboard portions of said spar are spaced from their associated blade cuffs to permit rotational twisting movement of said inboard spar portions with respect to said blade cuffs.

3. The combination defined in claim 2 wherein said means for mounting said spar to said mast comprises a spar yoke assembly mounted on said mast for rotation therewith, said spar yoke assembly defining a spar flapping axis about which said one-piece spar pivots.

4. The combination defined in claim 2 and further characterized by elastomeric bearing means between the inboard end of each blade cuff and said spar whereby said spar can react bending loads imposed by the blade cuff without interfering with the relative twisting movement of said inboard spar portion with respect to said blade cuff.

5. The combination defined in claim 2 wherein said spar is of generally elliptical cross section throughout a substantial portion of its length, and said spar being hollow to provide blade stiffness in bending with relatively low blade weight.

6. The combination defined in claim 5 wherein said blade panels are formed in split halves of honeycomb construction around said outboard spar portions, and each of said blade panels further including a fiberglass member at its inboard end surrounding said spar and bonded to said spar and to an associated one of said blade cuffs.

7. The combination defined in claim 6 wherein each blade cuff includes a pitch horn formed integrally therewith and extending generally forwardly in the plane of rotation of said blades.

8. The combination defined in claim 5 wherein said means for mounting said spar to said mast comprises a spar yoke assembly mounted on said mast for rotation therewith, said spar yoke assembly defining a spar flapping axis about which said one-piece spar pivots.

9. The combination defined in claim 8 and further characterized by bearing means between the inboard end of each blade cuff and said spar whereby said spar can react bending loads imposed by the blade cuff without interferring with the relative twisting movement of said inboard spar portion with respect to said blade cuff.

10. The combination defined in claim 5 wherein said spar is of generally elliptical cross section with the major axis of the ellipse being arranged in the plane of rotation of the rotor system, each of said blade panels being formed of metal honeycomb construction around said elliptical outboard spar portions, and each of said blade panels further including a wedge-shaped fiberglass member at its inboard end surrounding said spar and bonded thereto and to an associated one of said blade cuffs.

References Cited

UNITED STATES PATENTS

| 2,486,710 | 11/1949 | Gluhareff | 170—160.5 |
| 2,627,928 | 2/1953 | Mullgardt | 170—160.5 XR |
| 2,830,669 | 4/1958 | Klockner | 170—160.27 |
| 3,237,697 | 3/1966 | Ford et al. | 170—159 |
| 3,288,395 | 11/1966 | Krohncke | 170—160.26 |
| 3,292,710 | 12/1966 | Grut | 170—160.5 XR |
| 3,310,117 | 3/1967 | Slivinsky et al. | 170—159 |
| 3,321,019 | 5/1967 | Dmitroff et al. | 170—159 |

FOREIGN PATENTS 532,399  11/1921  France.

EVERETTE A. POWELL, Jr., Primary Examiner

U.S. Cl. X.R.

416—226, 240